United States Patent [19]

Tomiyoshi et al.

[11] Patent Number: 5,631,670
[45] Date of Patent: May 20, 1997

[54] INFORMATION DISPLAY DEVICE CAPABLE OF INCREASING DETECTION SPEED AND DETECTION ACCURACY OF INPUT COORDINATES ON DISPLAY SCREEN BY DETECTING MOVEMENT AMOUNT OF ELECTRONIC PEN

[75] Inventors: Akira Tomiyoshi, Nara; Takafumi Kawaguchi, Yamatotakada; Makoto Takeda, Nara, all of Japan

[73] Assignee: Sharp Kabushiki Kaisha, Osaka, Japan

[21] Appl. No.: 329,252

[22] Filed: Oct. 26, 1994

[30] Foreign Application Priority Data

Oct. 27, 1993 [JP] Japan ................... 5-268657

[51] Int. Cl.$^6$ ........................... G09G 5/00
[52] U.S. Cl. ........................ 345/173; 345/178
[58] Field of Search ............... 178/18–20; 371/48, 371/57.2, 64; 345/104, 173, 178

[56] References Cited

U.S. PATENT DOCUMENTS

| | | | |
|---|---|---|---|
| 5,392,058 | 2/1995 | Tagawa | 345/173 X |
| 5,434,371 | 7/1995 | Brooks | 178/18 |
| 5,459,463 | 10/1995 | Gruaz et al. | 178/18 X |

FOREIGN PATENT DOCUMENTS

| | | |
|---|---|---|
| 1-140323 | 6/1989 | Japan . |
| 3-294919 | of 1991 | Japan . |
| 3-257613 | 11/1991 | Japan . |

*Primary Examiner*—Ulysses Weldon
*Attorney, Agent, or Firm*—Nixon & Vanderhye P.C.

[57] ABSTRACT

There is provided an information display device in which speed of detecting input coordinates on a display screen is increased. A coordinate detection circuit 7 detects indication coordinates at a tip end of an electronic pen 6 based on an induction voltage induced at a detection electrode of the electronic pen 6 in scanning a row electrode G and a column electrode S. A coordinate output circuit 17 obtains indication coordinates at the tip end of the electronic pen 6 based on a movement amount detection signal from a movement amount detecting section 20 of the electronic pen 6. A coordinate signal generating circuit 18 outputs an x-coordinate signal and a y-coordinate signal by combining the indication coordinates detected by the coordinate detection circuit 7 and the indication coordinates obtained by the coordinate output circuit 17. Thus by filling an interval between the indication coordinates detected by the coordinate detection circuit 7 with indication coordinates obtained by the coordinate output circuit 17, an apparent detection speed of the input coordinates can be increased.

18 Claims, 7 Drawing Sheets

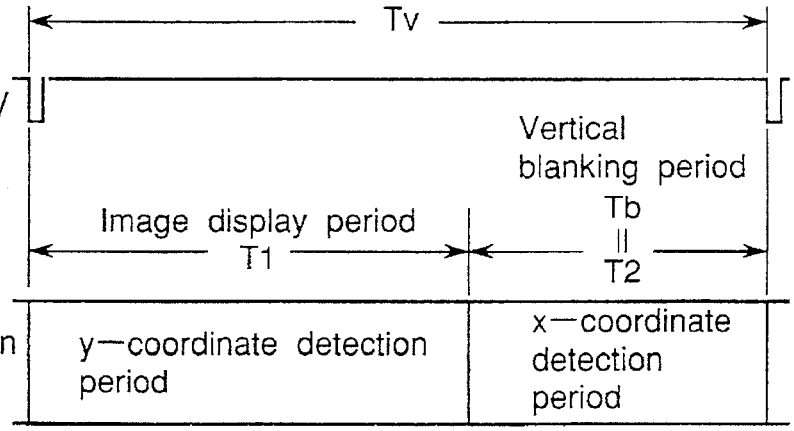
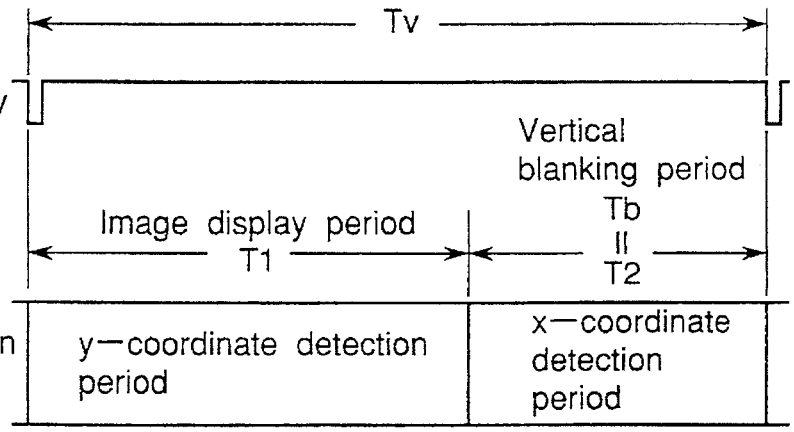

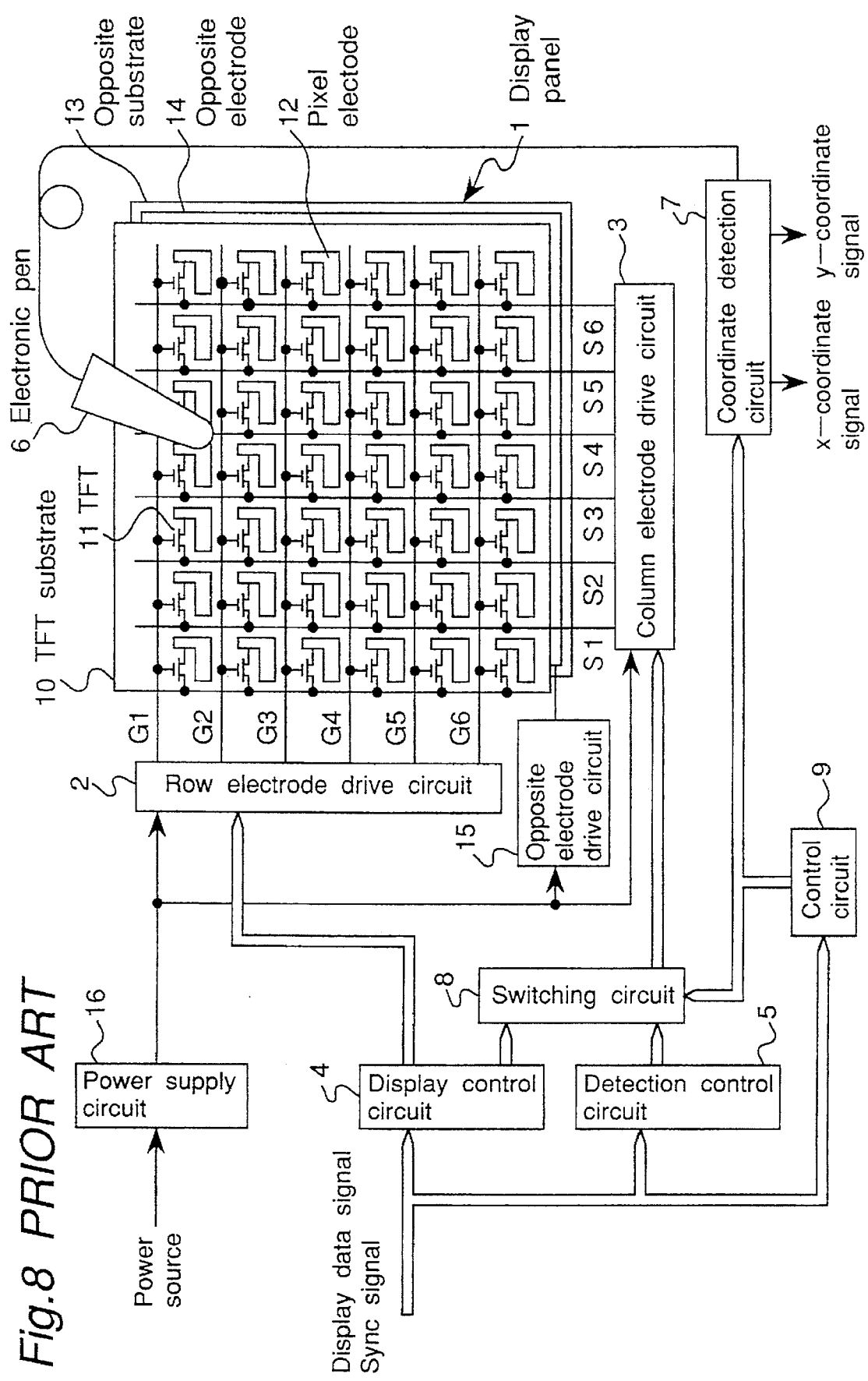

INFORMATION DISPLAY DEVICE CAPABLE OF INCREASING DETECTION SPEED AND DETECTION ACCURACY OF INPUT COORDINATES ON DISPLAY SCREEN BY DETECTING MOVEMENT AMOUNT OF ELECTRONIC PEN

BACKGROUND OF THE INVENTION

1. Field of the Invention

The present invention relates to an information display device having a coordinate detecting section for use in connection with a television, a laptop computer, a word processor, or the like.

2. Description of the Prior Art

Conventionally, there has been a display-integrated type tablet device having both an image display function and a coordinate detection function (tablet function) as an active matrix type liquid crystal display device as shown in FIG. 8.

The display-integrated type tablet device includes an active matrix type liquid crystal display panel (referred to merely as a "LCD panel" hereinafter) 1, a row electrode drive circuit 2 and a column electrode drive circuit 3 for driving the LCD panel 1, a display control circuit 4 for supplying a display control signal to the row electrode drive circuit 2 and the column electrode drive circuit 3, a detection control circuit 5 for supplying a detection control signal to the column electrode drive circuit 3, a coordinate detection circuit 7 for detecting the coordinates at the tip end of an electronic pen 6 on the LCD panel 1 by receiving a signal from the electronic pen 6, and a control circuit 9 for controlling the coordinate detection circuit 7 and a switching circuit 8 to switch over between an image display operation and a coordinate detection operation.

The LCD panel 1 has a plurality of row electrodes G1, G2, G3, ..., G6 (an arbitrary row electrode referred to as "G" hereinafter) which are arranged mutually in parallel on a transparent TFT (thin film transistor) substrate 10, and a plurality of column electrodes S1, S2, S3, ..., S6 (an arbitrary column electrode referred to as "S" hereinafter) which are arranged mutually in parallel and perpendicularly to the row electrodes.

At the intersection of each row electrode G and each column electrode S is provided a TFT 11. Each TFT 11 has its gate electrode connected to the row electrode G and has its source electrode connected to the column electrode S. The TFT 11 has its drain electrode connected to a pixel electrode 12. Pixel electrodes 12 are arranged in a matrix form in areas segmented by the row electrodes G and the column electrodes S.

On a rear side of the TFT substrate 10 is provided an opposite substrate 13 opposite to the TFT substrate 10. On an internal surface of the opposite substrate 13 is provided an opposite electrode 14 in an area approximately identical to that of the TFT substrate 10. Between the pixel electrodes 12 and the opposite electrode 14 are interposed liquid crystals (not shown) to constitute a pixel matrix.

To the opposite electrode 14 is supplied a bias voltage by means of a power supply circuit 16 and an opposite electrode drive circuit 15.

The row electrode drive circuit 2 scans the row electrode G by successively applying row electrode scanning signals g1 through g6 (an arbitrary row electrode scanning signal referred to as "g" hereinafter) (not shown) to each row electrode G on the display panel 1. Then a scanning pulse is applied to the gate electrode of the TFT 11 via the row electrode G to turn on the TFT 11.

The column electrode drive circuit 3 applies column electrode drive signals $s_1 1$ through $s_1 6$ (an arbitrary column electrode drive signal referred to as "$s_1$" hereinafter) (not shown) having a drive pulse corresponding to the display contents of the pixel relevant to each row electrode G to column electrodes S in synchronization with the scanning of the row electrode G. Then a drive pulse is applied to the source electrode of each TFT 11 via the column electrode S, with which a signal voltage is applied to the pixel electrode 12 connected to the drain electrode of the TFT 11 which has been turned on by the scanning of the row electrode G by the row electrode drive circuit 2 in a manner as described above. Thus an image is written into each pixel according to the contents of display image.

The column electrode drive circuit 3 scans the column electrode S by successively applying scanning pulses of column electrode scanning signals $s_2 1$ through $s_2 6$ (an arbitrary column electrode scanning signal referred to as "$s_2$" hereinafter) (not shown) to the column electrodes independently of the scanning of the row electrode G.

It is to be noted that the scanning pulses generated by the row electrode drive circuit 2 and the drive pulses and scanning pulses generated by the column electrode drive circuit 3 are generated based on a bias voltage from the power supply circuit 16.

The display control circuit 4 generates a display control signal for displaying an image on the LCD panel 1 based on a display data signal and a synchronization signal input externally. Then the generated display control signal is transmitted to the row electrode drive circuit 2 to control the operation of the row electrode drive circuit 2. Furthermore, the display control signal and the input display data signal are transmitted to the switching circuit 8. Meanwhile, the detection control circuit 5 generates a detection control signal for detecting the coordinates at the tip end of the electronic pen 6 based on the synchronization signal, and transmits the signal to the switching circuit 8.

The switching circuit 8 switchingly selects the display control signal and display data signal from the display control circuit 4 or the detection control signal from the detection control circuit 5 based on a switching signal from the control circuit 9, and transmits the selected signal to the column electrode drive circuit 3. Thus the operation of the column electrode drive circuit 3 is controlled by the display control signal or the detection control signal.

The electronic pen 6 has at its tip end a detection electrode (not shown) having a high impedance electrostatically coupled with the row electrode G and the column electrode S on the display panel 1. An induction voltage is induced at the detection electrode due to a scanning pulse applied to the row electrode G or a scanning pulse applied to the column electrode S. The coordinate detection circuit 7 detects a generating timing of the induction voltage induced at the detection electrode of the electronic pen 6 based on a coordinate detection timing signal from the control circuit 9 to detect the coordinates at the tip end of the electronic pen 6.

FIGS. 9A and 9B are charts showing the operation timing of the above-mentioned display-integrated type tablet device. One cycle Tv of a vertical sync signal V that is one of the aforementioned synchronization signals is divided into a one-frame image display period (y-coordinate detection period) T1 and an x-coordinate detection period T2, where the x-coordinate detection period T2 is equal to a vertical blanking period Tb. The division of the one cycle into the image display period (y-coordinate detection period)

T1 and the x-coordinate detection period T2 is executed by switchingly selecting between the display control circuit 4 and the detection control circuit 5 by means of the switching circuit 8.

Unfortunately, the aforementioned conventional display-integrated type tablet device has the following problems.

A first problem will now be described. According to the operation timing of the display-integrated type tablet device, there is required a time corresponding to one cycle Tv of the vertical sync signal V in order to detect the coordinates at the tip end of the electronic pen 6 on the display panel 1. The reason for the above is that, in detecting the coordinates at the tip end of the electronic pen 6, the column electrode scanning signals $s_2$ applied successively to the column electrodes S in the vertical blanking period Tb are utilized to detect the x-coordinate value, and the row electrode scanning signals g applied successively to the row electrodes G in the image display period T1 are utilized to detect the y-coordinate value. The above-mentioned arrangement allows the coordinates at only one point to be detected in one cycle Tv of the vertical sync signal V.

According to the above-mentioned arrangement, when the frequency of the vertical sync signal V is 60 Hz, detection of coordinates at 60 points per second is permitted. However, when coordinate detection at a faster speed is required, for example, in the case of inputting an alphabet character in longhand, a reduced character recognition accuracy or impossible character recognition results.

FIG. 10 shows an exemplified image display in the case where a character "a" is input in longhand. In the present case, the movement speed of the electronic pen 6 is so fast that the coordinate detection speed cannot catch up with the input speed. Therefore, only a reduced number of points P of a series of points constituting the character "a" are displayed as shown in FIG. 10, and therefore the series of points displayed cannot be recognized as the character "a".

Furthermore, in the case of a display device capable of detecting input coordinates other than the display-integrated type tablet device, so long as the input coordinates are detected in a specified cycle, detection of the input coordinates in a cycle faster than the specified cycle cannot be achieved though there is a difference depending on the adopted coordinate detection method.

A second problem will now be described. In the aforementioned display-integrated type tablet device, the x-coordinate value at the tip end of the electronic pen 6 is detected by successively applying a scanning pulse of the column electrode scanning signal $s_2$ to each column electrode S in the vertical blanking period Tb. In the above case, there is a time lag or propagation delay in the transmission of the scanning pulse through the applied column electrode scanning signal $s_2$ at the leading end of each column electrode S. When the time lag or propagation delay is great, a degraded coordinate detection accuracy results.

When a time margin is in the vertical blanking period Tb, the column electrode scanning signal $s_2$ can scan each column electrode S at a speed slower than the scanning speed of the column electrode drive signal $s_1$ in the image display period T1, and therefore the x-coordinate detection accuracy can be increased by correcting the detected coordinate value. However, since a specified time is practically consumed in the image display period T1, there is no time margin for effecting the correction in the vertical blanking period Tb, and therefore the conventional coordinate detection accuracy has not been good.

SUMMARY OF THE INVENTION

The object of the present invention is therefore to provide an information display device capable of increasing the detection speed and detection accuracy of input coordinates on a display screen of an information display section (CRT, LCD panel, or the like).

In order to achieve the aforementioned object, the present invention provides an information display device including an input section, an information display section having an electrode at least for detecting a position, a display control circuit for displaying image information on a display screen of the information display section, and a coordinate detecting section for detecting indication coordinates on the display screen pointed by the input section in accordance with a timing of detecting electrostatic coupling between the input section and a scanned electrode of the information display section, the information display device comprising:

a movement amount detecting section which is provided at a tip end portion of the input section and detects an amount of movement of the input section on the display screen to output a movement amount detection signal;

a coordinate output section which obtains indication coordinates of the input section based on the movement amount detection signal from the movement amount detecting section of the input section and a reference point, and outputs the indication coordinates; and a coordinate signal generating section which outputs a coordinate signal representing the indication coordinates of the input section based on the indication coordinates detected by the coordinate detecting section and the indication coordinates obtained by the coordinate output section.

According to the present invention, when the input section slides on the display screen of the information display section, indication coordinates on the display screen pointed by the input section are detected by the coordinate detecting section based on a timing of detecting electrostatic coupling between the input section and the scanned electrode. Meanwhile, the amount of movement of the input section is detected by the movement amount detecting section provided at the tip end of the input section, and a movement amount detection signal is output.

Then the movement amount detection signal output from the movement amount detecting section of the input section is taken in the coordinate output section, and the indication coordinates of the input section are obtained and output. Then a coordinate signal representing the indication coordinates of the input section is output by the coordinate signal generating section based on the indication coordinates detected by the coordinate detecting section and the indication coordinates obtained by the coordinate output section.

Thus the interval of indication coordinates detected by the coordinate detecting section are filled with the indication coordinates obtained by the coordinate output section.

According to an embodiment, the rotary section provided at the tip end of the input section rotates on the display screen, and the rotation of the rotary section is detected by the rotation detecting section to output the movement amount detection signal representing the number of rotation.

Thus the movement amount detection signal representing the amount of movement of the input section is easily output.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 3A, 3B, and 3C are charts showing an exemplified operation timing in the display-integrated type tablet device shown in FIG. 1;

FIGS. 5A, 5B, and 5C are charts showing an operation timing different from the operation timing shown in FIGS. 3A, 3B, and 3C;

FIG. 8 is a block diagram of a conventional display-integrated type tablet device;

DETAILED DESCRIPTION OF THE PREFERRED EMBODIMENTS

The present invention will be describes in detail with reference to the attached drawings.

Figure 1:
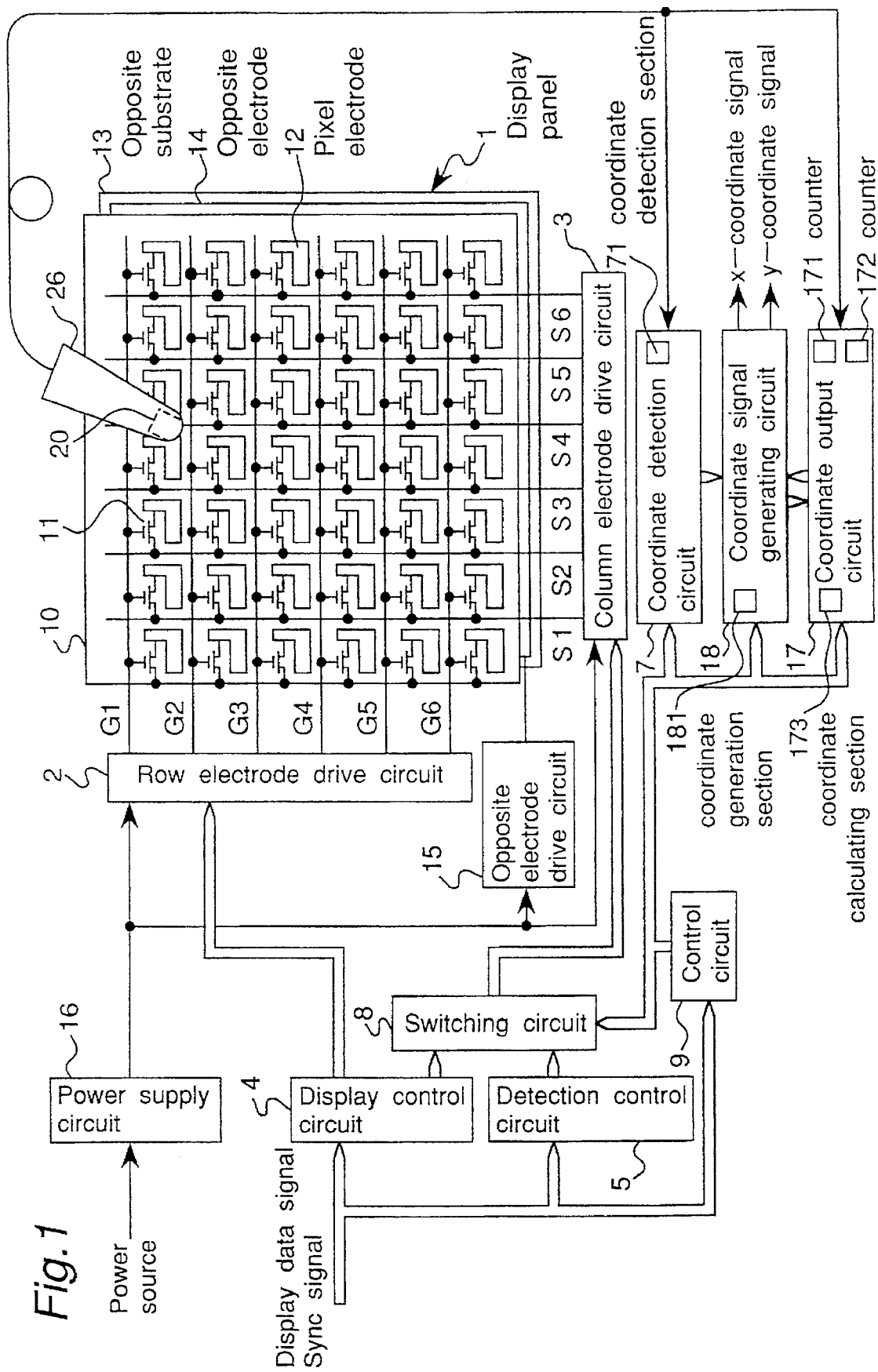
FIG. 1 is a block diagram of a display-integrated type tablet device which is an embodiment of the information display device of the present invention.

FIG. 1 is a block diagram of the basic construction of a display-integrated type tablet device as an information display device of the present embodiment.

Figure 2:
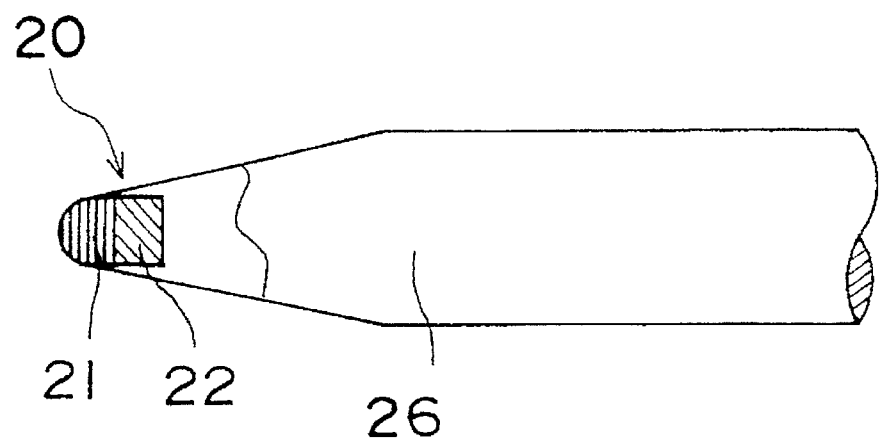
FIG. 2 is a schematic diagram of the structure of an electronic pen shown in FIG. 1.
Figure 10:
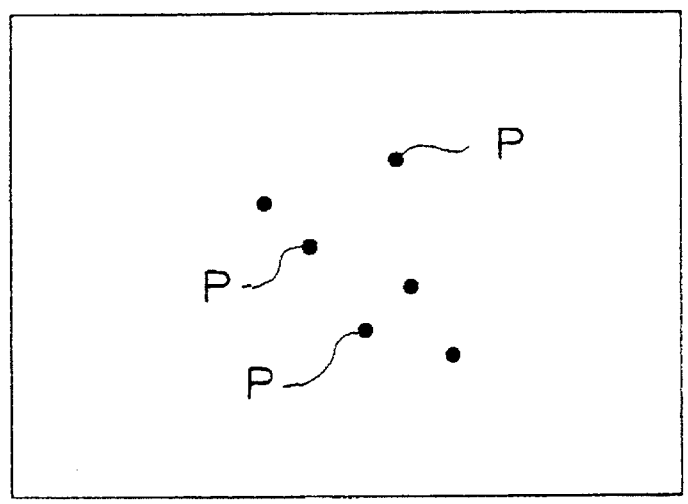
FIG. 10 shows exemplified indication coordinates detected by the conventional display-integrated type tablet device shown in FIG. 8.

The display-integrated type tablet device as shown in FIGS. 1 and 2 has a construction in which a movement amount detecting section 20 and a coordinate output circuit 17 which obtain indication coordinates of an electronic pen 26 based on the amount of movement of the electronic pen 26, and a coordinate signal generating circuit 18 which generates filling coordinates from the indication coordinates obtained by the coordinate output circuit 17 are incorporated into the conventional display-integrated type tablet device shown in FIG. 8. An x-coordinate signal and a y-coordinate signal representing the indication coordinates of the electronic pen 26 are finally output from the coordinate signal generating circuit 18.

It is to be noted that the circuits and sections except for the movement amount detecting section 20, coordinate output circuit 17, and the coordinate signal generating circuit 18 are denoted by the same reference numerals as in FIG. 8, and no detailed description therefor is provided in the following description.

The present invention is intended to fill or complete the indication coordinates of the electronic pen 26 in the period in which no coordinate detection by electrode scanning can be performed. The above-mentioned arrangement is achieved by detecting the amount of movement of the electronic pen 26 by means of the movement amount detecting section 20 provided at the electronic pen 26, and combining the indication coordinates of the electronic pen 26 based on the detected amount of movement with the indication coordinates at the tip end of the electronic pen 26 detected by the coordinate detection circuit 7 based on an induction voltage induced at the detection electrode of the electronic pen 26 when the row electrode G and the column electrode S are scanned.

FIG. 2 is a diagram showing a practical example of the movement amount detecting section 20 provided at the electronic pen 26 of the present embodiment. The movement amount detecting section 20 is comprised of a rotary section 21 and a rotation detecting section 22.

The rotary section 21 is provided to be externally exposed at the tip end of the electronic pen 26, and is made to rotate due to friction between the rotary section 21 and the display screen of the display panel 1 generated in a pen input stage with the electronic pen 26. Since the number of rotation of the rotary section 21 is the correct amount of movement of the electronic pen 26, the rotation of the rotary section 21 is detected by the rotation detecting section 22 in each direction of rotation. Then an x-direction movement amount detection signal consisting of a pulse output every rotation in the x-direction and a y-direction movement amount detection signal consisting of a pulse output every rotation in the y-direction are transmitted to the coordinate output circuit 17 in a route different from that of the aforementioned induction voltage.

Since the correct amount of movement cannot be obtained when the rotary section 21 slips on the display screen of the display panel 1, the rotary section 21 is required to be made of a material such that it does not slip on the display screen.

In the display-integrated type tablet device having the above-mentioned construction, the coordinate output circuit 17 takes in the x-direction movement amount detection signal and the y-direction movement amount detection signal output from the rotation detecting section 22 provided at the electronic pen 26 in a manner as described above, and counts the number of pulses of both the movement amount detection signals taken in by means of different built-in counters 171 and 172. Then the coordinate output circuit 17 calculates the x-coordinate value or the y-coordinate value by means of a coordinate calculating section 173 based on both the counted pulses and indication coordinates (reference point) detected by a coordinate detection circuit 7, and outputs the calculated coordinates to the coordinate signal generating circuit 18. An indication x-coordinate value is obtained by adding an x-coordinate value based on the x-direction movement amount detection signal to the x-coordinate value of the reference point, while an indication y-coordinate value is obtained by adding a y-coordinate value based on the y-direction movement amount detection signal to the y-coordinate value of the reference point. Then the coordinate signal generating circuit 18 generates indication coordinates of the electronic pen 26 by combining the x-coordinate value or the y-coordinate value based on the electrode scanning signal from the coordinate detection circuit 7 with the y-coordinate value or the x-coordinate value based on the amount of movement from the coordinate output circuit 17 by means of a coordinate generating section 181, and outputs an x-coordinate signal and a y-coordinate signal.

With the above-mentioned operations, coordinates at a point on a trace from the coordinates at a point (reference point) to the coordinates at a next point detected by the coordinate detection circuit 7 can be obtained from the amount of movement of the tip end of the electronic pen 26. Consequently, the apparent coordinate detection speed of the electronic pen 26 is improved relative to the conventional case.

Figures 9A, 9B:
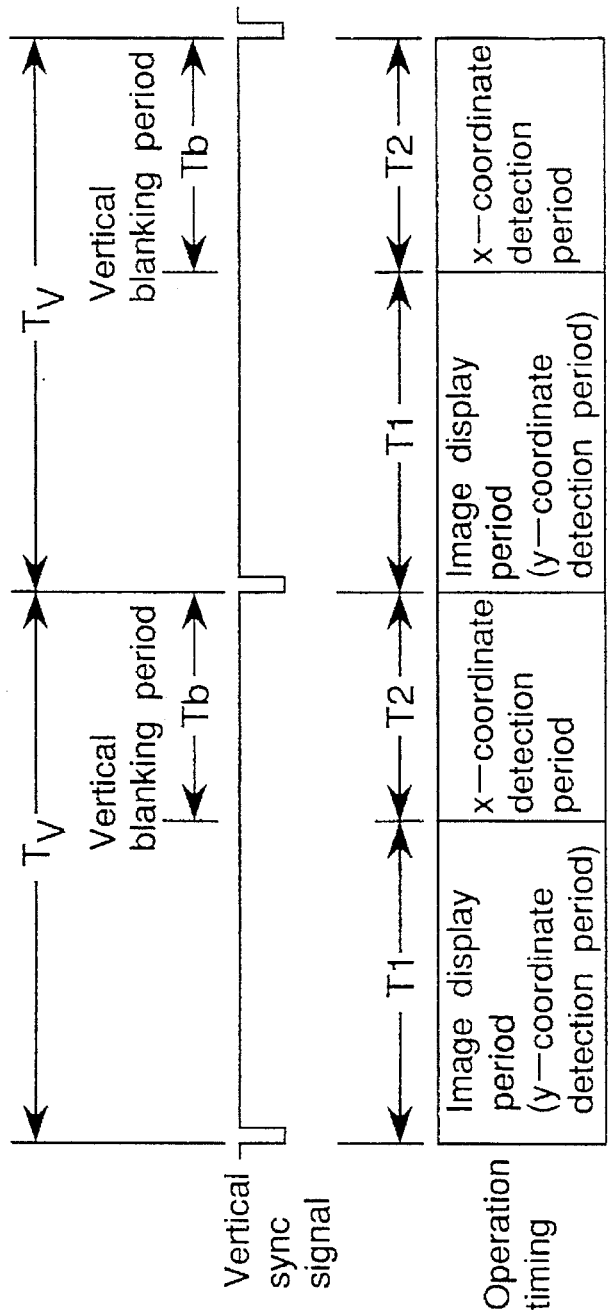
FIGS. 9A and 9B are charts showing an operation timing in the display-integrated type tablet device shown in FIG. 8.

In detecting the coordinates by the electrode scanning, the y-coordinate value cannot be detected in the x-coordinate detection period T2 in which the x-coordinate value is being detected as shown in FIGS. 9A and 9B. Similarity, the x-coordinate value cannot be detected in the y-coordinate detection period T1 in which the y-coordinate value is being detected. Therefore, according to the present embodiment, by detecting the amount of movement in the y-direction in the x-coordinate detection period T2 and detecting the amount of movement in the x-direction in the y-coordinate detection period T1, the indication coordinates of the electronic pen 26 are made to be obtained even when the x-coordinate value and the y-coordinate value are not coexisting through the coordinate detection by the electrode scanning.

FIGS. 3A, 3B, and 3C are timing charts of the operation of detecting coordinates by the electrode scanning (referred to merely as a "coordinate detection" hereinafter) and the operation of detecting the amount of movement of the present embodiment.

Referring to FIG. 3B, when the y-coordinate value at the tip end of the electronic pen 26 is determined by the coordinate detection section 71 of the coordinate detection circuit 7 in the y-coordinate detection period T1, the coordinate signal generating circuit 18 takes in the y-coordinate signal representing the determined y-coordinate value from the coordinate detection circuit 7. At the same time, an x-coordinate output command is transmitted to the coordinate output circuit 17. Then the coordinate output circuit 17 calculates the x-coordinate value based on the number of pulses of the x-direction movement amount detection signal at the point of time by means of the coordinate calculating section 173, and outputs an x-coordinate signal representing the x-coordinate value to the coordinate signal generating circuit 18. Thereafter, the contents of the counters 171 and 172 are cleared.

The reference point for calculating the x-coordinate value in the above time is determined to be the x-coordinate value determined by the coordinate detection circuit 7 in the previous x-coordinate detection period T2, and the objective x-coordinate value is obtained by adding the amount of movement in the x-direction based on the number of pulses to the previously determined x-coordinate value.

Then the coordinate signal generating circuit 18 determines the indication coordinates of the electronic pen 26 by combining the y-coordinate signal from the coordinate detection circuit 7 with the x-coordinate signal from the coordinate output circuit 17 by means of the coordinate generating section 181, and outputs the x-coordinate signal and the y-coordinate signal representing the indication coordinates.

Meanwhile, in the case where the x-coordinate value at the tip end of the electronic pen 26 is determined by the coordinate detection circuit 7 in the x-coordinate detection period T2, the coordinate calculating section 173 of the coordinate output circuit 17 calculates the y-coordinate value based on the number of pulses of the y-direction movement amount detection signal at the point of time according to a command from the coordinate signal generating circuit 18, transmits the y-coordinate signal representing the y-coordinate value to the coordinate signal generating circuit 18, and thereafter clears the contents of both the counters 171 and 172 in the same manner as described above. The reference point for calculating the y-coordinate value at the above time is determined to be the y-coordinate value determined by the coordinate detection circuit 7 in the previous y-coordinate detection period T1, and the objective y-coordinate value is obtained by adding the amount of movement in the y-direction based on the number of pulses to the determined y-coordinate value.

Then the coordinate signal generating circuit 18 determines the indication coordinates of the electronic pen 26 by combining the x-coordinate signal from the coordinate detection circuit 7 with the y-coordinate signal from the coordinate output circuit 17 by means of the coordinate generating section 181, and outputs the x-coordinate signal and the y-coordinate signal representing the indication coordinates.

According to the present embodiment as described above, the rotation of the rotary section 21 provided at the tip end of the electronic pen 26 in each of the x-direction and the y-direction is detected by the rotation detecting section 22, and the x-direction movement amount detection signal and the y-direction movement amount detection signal are output. Then the coordinate output circuit 17 is made to calculate the x-coordinate value based on the x-direction movement amount detection signal in the y-coordinate detection period T1 and calculate the y-coordinate value based on the y-direction movement amount detection signal in the x-coordinate detection period T2 at the coordinate detection operation timing according to the command from the coordinate signal generating circuit 18.

With the above-mentioned arrangement, the coordinates at a point can be determined in each of the y-coordinate detection period T1 and the x-coordinate detection period T2, and thereby the speed of detecting indication coordinates by means of the electronic pen 26 can be twice as fast as the coordinate detection speed achieved only by the conventional electrode scanning operation.

Figure 4:
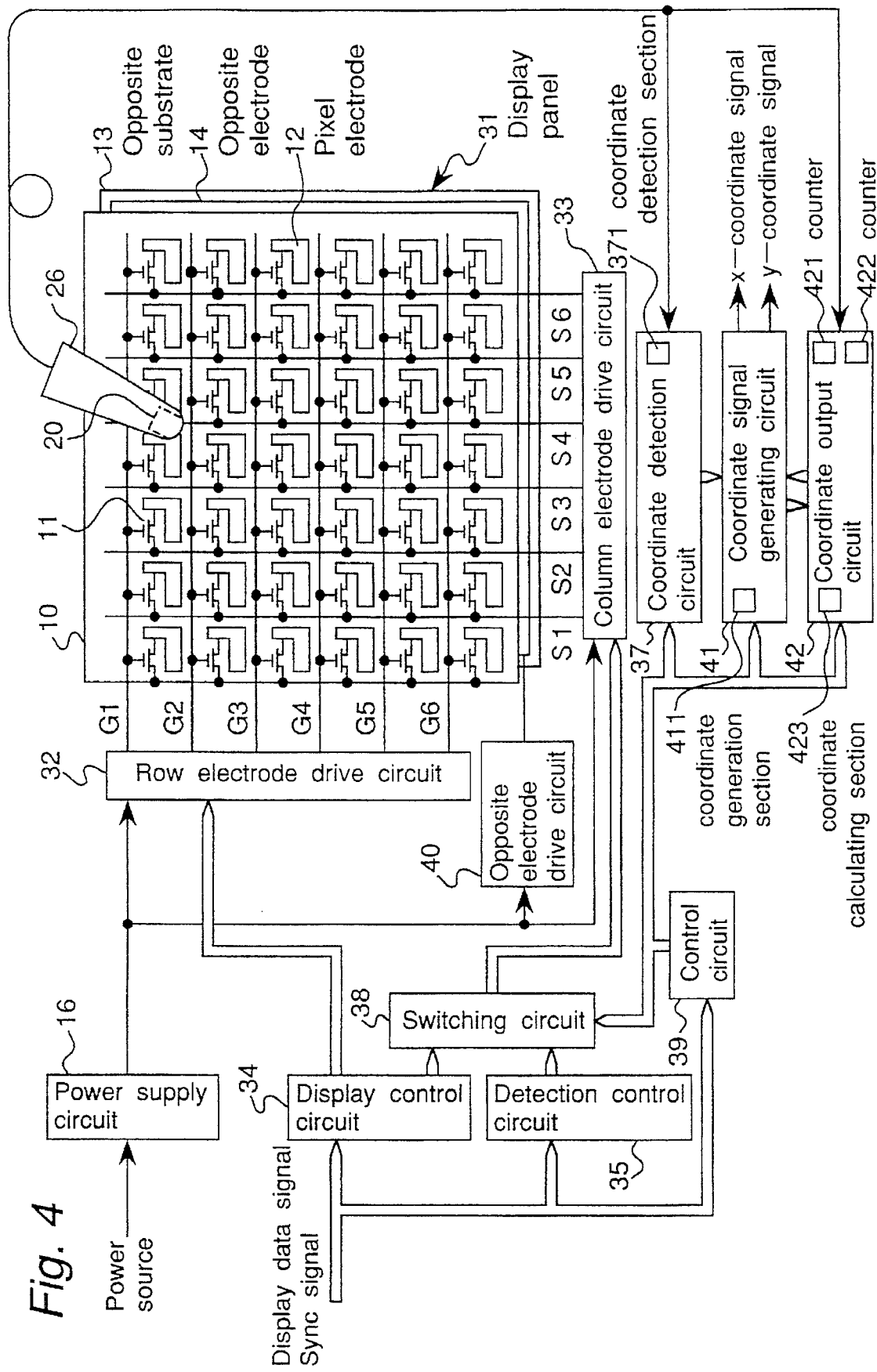
FIG. 4 is a block diagram of a display-integrated type tablet device different from the display-integrated type tablet device shown in FIG. 1.

FIG. 4 is a block diagram of a display-integrated type tablet device in accordance with another embodiment. A display panel 31, a row electrode drive circuit 32, a column electrode drive circuit 33, a display control circuit 34, a detection control circuit 35, a coordinate detection circuit 37, a switching circuit 38, a control circuit 39, and an opposite electrode drive circuit 40 have the same constructions and operations as those of the display panel 1, row electrode drive circuit 2, column electrode drive circuit 3, display control circuit 4, detection control circuit 5, coordinate detection circuit 7, switching circuit 8, control circuit 9, and opposite electrode drive circuit 15 of the aforementioned embodiment.

FIGS. 5A, 5B, and 5C are timing charts of the coordinate detection operation and the movement amount detection operation of the aforementioned embodiment.

According to the present embodiment, the amount of movement of the tip end of the electronic pen 26 in each of the x-direction and the y-direction is uninterruptedly detected independently of the coordinate detection by the electrode scanning. In the present case, the method of detecting the coordinates and the method of detecting the amount of movement are quite different from each other, and therefore no interference occurs.

A coordinate output circuit 42 takes in an x-direction movement amount detection signal and a y-direction movement amount detection signal from the electronic pen 26 in the same manner as in the coordinate output circuit 17 shown in FIG. 1, and counts the number of pulses of both the movement amount detection signals taken in by means of built-in counters 421 and 422. Then in response to a coordinate output command signal transmitted from a coordinate signal generating circuit 41, the amount of movement in the x-direction and the amount of movement in the y-direction based on the number of pulses are added to the x-coordinate value and the y-coordinate value obtained previously based on the electrode scanning by means of a built-in coordinate calculating section 423 to obtain the indication coordinates of the electronic pen 26, and then outputs an x-coordinate signal and a y-coordinate signal representing the indication coordinates.

When the coordinate detecting operation based on the electrode scanning in the x-coordinate detection period T2 completes, the coordinate signal generating circuit 41 takes in the x-coordinate signal and the y-coordinate signal from the coordinate detection circuit 37 by means of a coordinate generating section 411, and then outputs the signals to the outside. Meanwhile, a coordinate output command is transmitted from the coordinate signal generating circuit 41 to the coordinate output circuit 42 at a predetermined timing to take in the x-coordinate signal and the y-coordinate signal representing the indication coordinates of the electronic pen 26 based on the detection of the amount of movement from the coordinate output circuit 42, and the signals are output as filling coordinates to the outside.

In the above case, every time the coordinate signal generating circuit 41 takes in both the coordinate signals from the coordinate detection circuit 37, the coordinate signal generating circuit 41 outputs a command to the coordinate output circuit 42 to clear the contents of both the built-in counters 421 and 422. Consequently, the coordinate output circuit 42 can determine the reference point in calculating the indication coordinates based on the amount of movement as the coordinates detected by the electrode scanning operation.

Figure 6:
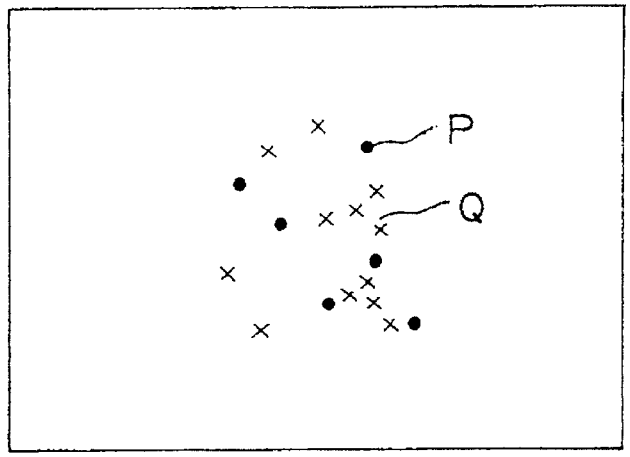
FIG. 6 is an explanatory view of detection coordinates detected by the coordinate detection circuit and filling coordinates obtained by the coordinate output circuit shown in FIG. 1.
Figure 7:
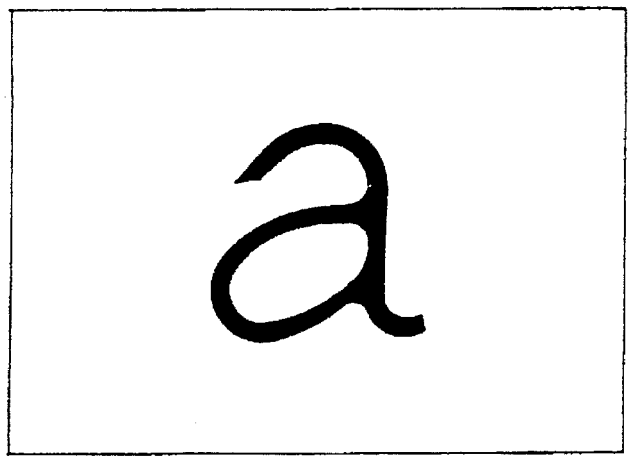
FIG. 7 is a chart of a recognition result based on the detection coordinates and the filling coordinates shown in FIG. 6.

FIG. 6 shows an exemplified result of detecting the indication coordinates at the tip end of the electronic pen 26 when a character "a" is input by means of the electronic pen 26 in a manner as described hereinbefore, and FIG. 7 shows a result of recognizing the character based on the indication coordinates. As shown in FIG. 6, the detection coordinates P based on the scanning of the row electrode G and the column electrode S can be filled or connected with filling coordinates Q based on the movement amount detection signals, and therefore the recognized character "a" is displayed according to the connection between both the coordinates in a manner as shown in FIG. 7.

Although adjacent ones of the detection coordinates P are filled or connected with two filling coordinates Q in FIG. 6, the present invention is not limited to this.

Thus the apparent coordinate detection speed can be increased without increasing the coordinate detection speed by the electrode scanning, and the indication coordinates at the tip end of the electronic pen 6 required for the recognition can be obtained while keeping the quality of the display image.

The construction of the movement amount detecting section provided at the electronic pen 26 of each of the aforementioned embodiments is not limited to the construction shown in FIG. 2, and it is acceptable to utilize a gyroscope, or the like.

As is evident from the above, the information display device of the present invention obtains the indication coordinates of the input section by means of the coordinate output section based on the movement amount detection signal from the movement amount detecting section of the input section, and outputs the coordinate signals based on the indication coordinates detected by the coordinate detecting section and the indication coordinates obtained by the coordinate output section. With the above-mentioned arrangement, the indication coordinates can be obtained based on the amount of movement of the input section independently of the indication coordinates detected by the coordinate detecting section.

Therefore, the apparent detection speed of the indication coordinates of the input section can be increased.

In the above case, there is no need to increase the coordinate detection speed by the coordinate detecting section, which allows the input coordinate detection accuracy to be increased.

Furthermore, in the information display device of an embodiment, the movement amount detecting section is comprised of a rotary section and a rotation detecting section for outputting a movement amount detection signal representing the number of rotations of the rotary section. With the above-mentioned arrangement, the amount of movement of the input section can be easily detected by the number of rotations of the rotary section.

Furthermore, in the information display device of an embodiment, the y-coordinate value from the coordinate output section is taken in by the coordinate signal generating section in a period in which the x-coordinate value of the indication coordinates is detected by the coordinate detecting section, and the coordinate detection signals representing a pair of indication coordinates obtained by combining both the coordinates are output. Meanwhile, the x-coordinate value from the coordinate output section is taken in by the coordinate signal generating section in a period in which the y-coordinate value is detected by the coordinate detecting section, and the coordinate detection signals representing a pair of indication coordinates obtained by combining both the coordinates are output. Therefore, two pairs of indication coordinates can be obtained at the timing of detecting a pair of indication coordinates by the coordinate detecting section.

With the above-mentioned arrangement, the detection speed of the indication coordinates of the input section can be twice as fast as the detection speed achieved only by the coordinate detecting section.

According to another embodiment, the indication coordinates from the coordinate output section are taken in by the coordinate signal generating section in accordance with a specified timing independently of the indication coordinates of the input section detected by the coordinate detecting section to fill or complete the indication coordinates detected by the coordinate detecting section. With the above-mentioned arrangement, the apparent detection speed of the indication coordinates of the input section can be increased to an optimum value.

Furthermore, in the information display device of an embodiment, every time indication coordinates of the input section are detected by the coordinate detecting section, the coordinate output section determines the reference point in obtaining indication coordinates based on the movement amount detection signals from the input section as the indication coordinates detected by the coordinate detecting section. With the above-mentioned arrangement, the possible displacement of the indication coordinates obtained by the coordinate output section with respect to the indication coordinates detected by the coordinate detecting section can be corrected.

Therefore, according to the present invention, the input coordinate detection accuracy can be increased.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An information display device including an input section, an information display section having an electrode at least for detecting a position, a display control circuit for displaying image information on a display screen of the information display section, and a coordinate detecting section for detecting indication coordinates on the display screen pointed by the input section in accordance with a timing of detecting electrostatic coupling between the input section and a scanned electrode of the information display section, the information display device comprising:

a movement amount detecting section which is provided at a tip end portion of the input section and detects an amount of movement of the input section on the display screen to output a movement amount detection signal;

a coordinate output section which obtains indication coordinates of the input section based on the movement amount detection signal from the movement amount detecting section of the input section and a reference point, and outputs the indication coordinates; and a coordinate signal generating section which outputs a coordinate signal representing the indication coordinates of the input section based on the indication coordinates detected by the coordinate detecting section and the indication coordinates obtained by the coordinate output section.

2. An information display device as claimed in claim 1, wherein the movement amount detecting section provided at the tip end portion of the input section includes a rotary section which rotates in accordance with a movement of the input section in contact with the display screen; and a rotation detecting section which detects rotation of the rotary section and outputs the movement amount detection signal representing a number of rotation of the rotary section.

3. An information display device as claimed in claim 1, wherein the coordinate signal generating section takes in, in a period in which an x-coordinate value of the indication coordinates of the input section is detected by the coordinate detecting section, a y-coordinate value of the indication coordinates output from the coordinate output section to output a coordinate signal representing a pair of indication coordinates obtained by combining the x-coordinate value with the y-coordinate value, and takes in, in a period in which a y-coordinate value of the indication coordinates is detected by the coordinate detecting section, an x-coordinate value of the indication coordinates output from the coordinate output section to output a coordinate signal representing a pair of indication coordinates obtained by combining the y-coordinate value with the x-coordinate value.

4. An information display device as claimed in claim 1, wherein the coordinate signal generating section takes in the indication coordinates of the input section detected by the coordinate detecting section to output a coordinate signal representing the indication coordinates, and takes in the indication coordinates from the coordinate output section in accordance with a specified timing to generate and output a coordinate signal representing interpolation coordinates for interpolating the indication coordinates detected by the coordinate detecting section.

5. An information display device as claimed in claim 3, wherein the coordinate output section determines the indication coordinates detected by the coordinate detecting section as the reference point in obtaining the indication coordinates based on the movement amount detection signal when the indication coordinates of the input section are detected by the coordinate detecting section.

6. An information display device as claimed in claim 4, wherein the coordinate output section determines the indication coordinates detected by the coordinate detecting section as the reference point in obtaining the indication coordinates based on the movement amount detection signal when the indication coordinates of the input section are detected by the coordinate detecting section.

7. An information display device including an input section, an information display section having an electrode at least for detecting a position, a display control circuit for displaying image information on a display screen of the information display section, and a coordinate detecting section for detecting indication coordinates on the display screen pointed by the input section in accordance with a timing of detecting electrostatic coupling between the input section and a scanned electrode of the information display section, the information display device comprising:

a movement a mount detecting section which is provided at a tip end portion of the input section and detects an mount of movement of the input section on the display screen to output a movement mount detection signal;

a coordinate output section which obtains indication coordinates of the input section based on the movement mount detection signal from the movement amount detecting section of the input section and outputs the indication coordinates; and a coordinate signal generating section which outputs a coordinate signal representing the indication coordinates of the input section based on the indication coordinates detected by the coordinate detecting section and the indication coordinates obtained by the coordinate output section.

8. An information display device as claimed in claim 7, wherein the movement amount detecting section provided at the tip end portion of the input section includes a rotary section which rotates in accordance with a movement of the input section in contact with the display screen; and a rotation detecting section which detects rotation of the rotary section and outputs the movement amount detection signal representing a number of rotation of the rotary section.

9. An information display device as claimed in claim 7, wherein the coordinate signal generating section takes in, in a period in which an x-coordinate value of the indication coordinates of the input section is detected by the coordinate detecting section, a y-coordinate value of the indication coordinates output from the coordinate output section to output a coordinate signal representing a pair of indication coordinates obtained by combining the x-coordinate value with the y-coordinate value, and takes in, in a period in which a y-coordinate value of the indication coordinates is detected by the coordinate detecting section, an x-coordinate value of the indication coordinates output from the coordinate output section to output a coordinate signal representing a pair of indication coordinates obtained by combining the y-coordinate value with the x-coordinate value.

10. An information display device as claimed in claim 9, wherein the coordinate output section determines the indication coordinates detected by the coordinate detecting section as the reference point in obtaining the indication coordinates based on the movement amount detection signal when the indication coordinates of the input section are detected by the coordinate detecting section.

11. An information display device as claimed in claim 7, wherein the coordinate signal generating section takes in the indication coordinates of the input section detected by the coordinate detecting section to output a coordinate signal representing the indication coordinates, and takes in the indication coordinates from the coordinate output section in accordance with a specified timing to generate and output a coordinate signal representing interpolation coordinates for interpolating the indication coordinates detected by the coordinate detecting section.

12. An information display device as claimed in claim 11, wherein the coordinate output section determines the indication coordinates detected by the coordinate detecting section as the reference point in obtaining the indication coordinates based on the movement amount detection signal when the indication coordinates of the input section are detected by the coordinate detecting section.

13. A method of providing coordinates in an information display device including an input section, an information display section having an electrode at least for detecting a position, a display control circuit for displaying image information on a display screen of the information display section, and a coordinate detecting section for detecting indication coordinates on the display screen pointed by the input section in accordance with a timing of detecting electrostatic coupling between the input section and a scanned electrode of the information display section, comprising the steps of:

detecting an amount of movement of the input section on the display screen and outputting a movement amount detection signal;

obtaining indication coordinates of the input section based on the movement amount detection signal;

providing a coordinate signal representing the indication coordinates of the input section based on the indication coordinates detected by the coordinate detecting section and the indication coordinates obtained from said movement amount detection signal.

14. The method of claim 13, wherein said input section includes a tip end having a rotary section which rotates in accordance with movement of the input section in contact with said display screen, and wherein said movement detecting step outputs the movement amount detection signal representing a number of rotations of the rotation section.

15. The method of claim 13, wherein said step of providing a coordinate signal takes in, in a period in which an x-coordinate value of the indication coordinates of the input section is detected by the coordinate detecting section, a y-coordinate value of the indication coordinates obtained from said movement amount detection signal to output a coordinate signal representing a pair of indication coordinates obtained by combining the x-coordinate value with the y-coordinate value, and takes in, in a period in which a y-coordinate value of the indication coordinates is detected by the coordinate detecting section, an x-coordinate value of the indication coordinates obtained from said movement amount detection signal to output a coordinate signal representing a pair of indication coordinates obtained by combining the y-coordinate value with the x-coordinate value.

16. The method of claim 15, wherein said obtaining step determines the indication coordinates detected by the coordinate detecting section as the reference point in obtaining the indication coordinates based on the movement amount detection signal when the indication coordinates of the input section are detected by the coordinate detecting section.

17. The method of claim 13, wherein said step of providing a coordinate signal takes in the indication coordinates of the input section detected by the coordinate detecting section to output a coordinate signal representing the indication coordinates, and takes in the indication coordinates obtained from said movement amount detection signal in accordance with a specified timing to generate and output a coordinate signal representing interpolation coordinates for interpolating the indication coordinates detected by the coordinate detecting section.

18. The method of claim 17, wherein said obtaining step determines the indication coordinates detected by the coordinate detecting section as the reference point in obtaining the indication coordinates based on the movement amount detection signal when the indication coordinates of the input section are detected by the coordinate detecting section.

* * * * *